Aug. 16, 1966 H. SCHINDLER 3,266,072
APPARATUS FOR PROCESSING SHOE ENDS
Filed Aug. 23, 1965
Fig.1
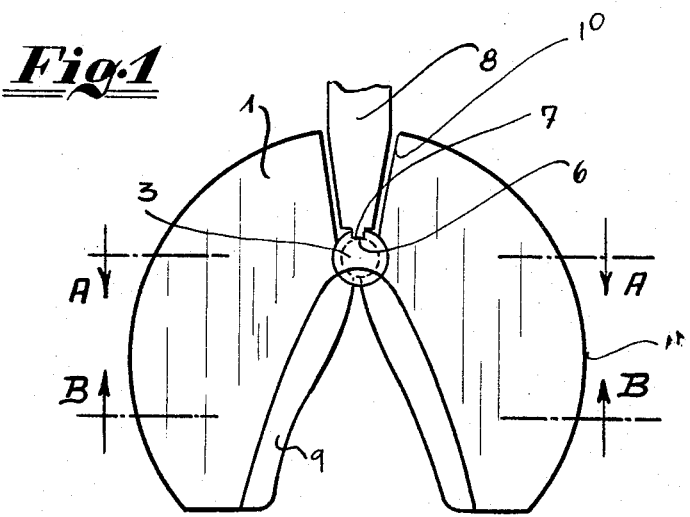
Fig.2
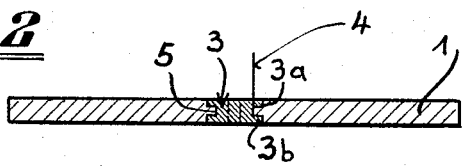
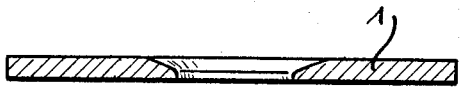
Fig.3

United States Patent Office 3,266,072
Patented August 16, 1966

3,266,072
APPARATUS FOR PROCESSING SHOE ENDS
Herbert Schindler, Pirmasens, Germany, assignor to Schon & Cie. G.m.b.H., Pirmasens, Germany
Filed Aug. 23, 1965, Ser. No. 481,698
Claims priority, application Germany, Aug. 21, 1964, Sch 35,656
4 Claims. (Cl. 12—12)

The present invention relates to wipers for lasting machines for shoe ends, and which are provided with wiper halves and arcuate guides by means of which the wiper halves are pivotable about a common pivot.

In lasting machines for shoe ends, movable two-part wiper pairs are used for wiping-in or reeving the upper leather. These wiper pairs are so developed that half of the contour of the last is worked into the left part of the pair of wipers and the other half is worked into the right part of the pair of wipers. The two halves of the wipers meet at the tip of the contour of the last.

This point is, at the same time the pivot for the inward motion of the two wiper halves. Unfortunately, this development of the pivot for the wipers has the inherent risk that the upper leather of the shoe becomes jammed in the gap between the two wiper halves and that, during the subsequent wiping motion in the direction of the longitudinal axis of the shoe, the front portion of the entire leather material of the shoe is pulled forwardly in an unpermissible manner.

A further development of these wipers for lasting machines for shoe ends attempts to overcome this disadvantage by developing the pivot of the two wiper halves in such a manner that it prevents the formation of a vertical gap capable of squeezing the leather. In this embodiment, the pivot of the two wiper halves is developed circularly, and to the extent of half the wiper thickness on the left wiper member and to the extent of half the wiper thickness on the right wiper member, so that an engaging surface of contact of the circular pivot is formed.

However, this development of lasting wipers also has considerable disadvantages. The circularly developed portion of the wiper halves executes a rotary motion during the wiping in of the shoe and takes along the upper leather of the shoe in the direction of the rotary motion, because the entire shoe is pressed against the wipers with a specific pressure during the closing of the wipers. A shoe made of delicate upper leather, worked with lasting wipers developed in said manner, can be recognized at once by the tip portion where the leather is pushed sideways.

The wipers according to the present invention eliminate this disadvantage since the articulation of the wiper halves is unable to participate in the pivoting of the wiper halves and is arrested with the machine or the lasting head of the machine.

The present invention consists in that the counter-guides are located on a circular-cylindrical guide body which is associated with the wiper halves as an articulated member. Consequently, the novel wipers consist of the three members, namely, a left wiper half, a right wiper half, and a circular-cylindrical guide body.

According to our preferred embodiment of the invention, the guide body is developed as a disc inserted between the wiper halves in the same plane. In its edge, the disc is provided with a circular groove, in which engages an arcuately projecting guide strip of the wiper halves. It is connected to the fixed portion of the machine by a member which engages, by means of a stud, in a recess in its edge.

In the accompanying drawing which illustrates an embodiment of the invention:

FIGURE 1 is a plan view of wipers provided in accordance with the invention;

FIGURE 2 is a sectioinal view taken along line A—A of FIG. 1; and

FIGURE 3 is a sectional view taken along line B—B of FIG. 1, both sections being seen in the direction of the arrows.

The wipers of the invention more specifically comprise a left wiper half 1 and a right wiper half 2, which rotate about a cylinder body 3. The cylinder body 3 includes disc-like extremities 3a and 3b of at least approximately equal diameters and which define therebetween a peripheral and annular groove 4, which serves as a guide for the arcuate guide strips or ridges 5 which engage in said groove and which project from the wiper halves 1 and 2.

In its edge, the cylindrical body 3 has a radial opening or recess in which engages a member 8 by means of a stud or projection 7. Since the member 8 is firmly connected to the machine, it prevents concomitant rotation of the cylindrical body 3 when the wiper halves 1 and 2 execute swinging motions. At the same time, the member 8 limits the swinging-out motion of the wiper halves 1 and 2.

In working in cooperation with the last there are provided, naturally, working edges 9 and it will be seen in FIG. 3 that said edges are of coplanar relationship. Moreover, it will be seen in this figure as well as in FIGURE 2 that the halves 1 and 2 as well as the cylindrical body 3 are of a uniform and equal height.

In respect to the member 8 limiting the swinging-out motion of the wiper halves 1 and 2, it will be noted that the halves 1 and 2 are provided with heel portions 10 which are cooperatively arranged almost diametrally opposed from their respective working edges, so as to abut against the member 8 when the heel portions are pivoted towards one another. Accordingly, the displacement of the heel portions toward each other is limited.

It will also be noted that while the cylindrical body 3 and the ridges 5 engaging in the grooves 4 are concentric, the halves 1 and 2 have outer or peripheral edges 11 which although arcuate or circular define axes which are spaced from the pivot axis of the cylindrical body 3.

There will now be obvious to those skilled in the art many modifications and variations of the structure set forth above. These modifications and variations will not depart from the scope of the invention if defined by the following claims.

What is claimed is:
1. Apparatus for processing shoe ends comprising wiper halves having respective working edges, arcuate guide means on said halves, cooperating guide means engaged with said arcuate guide means and providing a common pivot axis for the same whereby the working edges can be displaced toward each other, and fixed means supporting said cooperating guide means; said cooperating guide means being a cylindrical body including upper and lower disc-like extremities of at least approximately equal diameters which extremities define an annular groove therebetween, the arcuate guide means being arcuate ridges on said halves, said ridges riding in said annular groove, said cylindrical body further having a radial opening and said fixed means including a projection engaging in said radial opening to hold the cylindrical body in stationary position, said halves including heel portions diametrally opposed to said working edges relative to said common pivot axis, said fixed means extending between and limiting the displacement of said heel portions towards each other so that the heel portions do not contact each other.

2. Apparatus as claimed in claim 1 wherein said working edges are coplanar.

3. Apparatus as claimed in claim 2 wherein the wiper halves and cylindrical body are of a uniform and equal height.

4. Apparatus as claimed in claim 3 wherein the cylindrical body and arcuate ridges are concentric, said wiper halves having arcuate outer edges defining axes spaced from the first said axis.

References Cited by the Examiner

UNITED STATES PATENTS

| | | | |
|---|---|---|---|
| 597,247 | 1/1898 | Preston | 12—12.4 |
| 3,032,790 | 5/1962 | Schwabe | 12—7.1 |
| 3,126,563 | 3/1964 | Kamborian | 12—7.1 X |

JORDAN FRANKLIN, *Primary Examiner.*

PATRICK D. LAWSON, *Examiner.*